United States Patent [19]

McDaniel

[11] 4,402,864

[45] Sep. 6, 1983

[54] CATALYST SUPPORT TREATED WITH TITANIUM POLYMER

[75] Inventor: Max P. McDaniel, Bartlesville, Okla.

[73] Assignee: Phillips Petroleum Company, Bartlesville, Okla.

[21] Appl. No.: 292,962

[22] Filed: Aug. 14, 1981

[51] Int. Cl.$^3$ ................................................ C08F 4/24
[52] U.S. Cl. .................................... 252/430; 252/437; 252/441; 252/458; 526/106
[58] Field of Search .................... 252/430, 431 R, 437, 252/441, 458

[56] References Cited

U.S. PATENT DOCUMENTS

| | | | |
|---|---|---|---|
| 2,621,193 | 12/1952 | Langrammerer | 260/414 |
| 3,166,542 | 1/1965 | Orzechowski et al. | 260/93.7 |
| 3,274,120 | 9/1966 | Aftandilian | 252/432 |
| 3,485,771 | 12/1969 | Horvath | 252/430 |
| 3,622,521 | 11/1971 | Hogan et al. | 252/430 |
| 3,670,043 | 6/1972 | Kubicek et al. | 252/431 R X |
| 3,780,011 | 12/1973 | Pullukat et al. | 252/430 X |
| 3,879,362 | 4/1975 | Chalfont et al. | 252/431 R X |
| 3,996,163 | 12/1976 | Crump et al. | 252/430 |
| 4,016,343 | 4/1977 | Hoff et al. | 252/430 X |
| 4,053,436 | 10/1977 | Hogan et al. | 252/458 X |
| 4,188,471 | 2/1980 | Nasser et al. | 252/431 R X |

OTHER PUBLICATIONS

Kirk–Othmer, *Encyclopedia of Chemical Technology*, vol. 20, pp. 456–458, (1960), 2nd Edition, Pub. by John Wiley & Sons, Inc.

*Primary Examiner*—Patrick Garvin

[57] ABSTRACT

A catalyst suitable for olefin polymerization is produced by combining an inorganic support with a titanium polymer to produce a support for chromium-containing catalyst. The resulting chromium-containing catalyst is activated in a conventional manner. This process allows incorporation of relatively high concentrations of titanium which is beneficial in achieving high melt index values in slurry polymerization systems.

9 Claims, No Drawings

CATALYST SUPPORT TREATED WITH TITANIUM POLYMER

BACKGROUND OF THE INVENTION

This invention relates to titanium-containing supports for olefin polymerization catalysts.

Supported chromium oxide catalysts can be used to prepare olefin polymers in a hydrocarbon solution to give a product having excellent characteristics from many standpoints. Supported chromium oxide catalysts can be used to prepare olefin polymers in a slurry system wherein the polymer is produced in the form of small particles of solid material suspended in a diluent. This process, frequently referred to as a particle-form process, has the advantage of being less complex. However, certain control operations which are easily carried out in the solution process are considerably more difficult in the particle-form process. For instance, in the solution process, control of the molecular weight can be effected by changing the temperature with lower molecular weight (higher melt flow) being obtained at the higher temperatures. However, in the slurry process, this technique is inherently limited since any effort to increase the melt flow to any appreciable extent by increasing temperature would cause the polymer to go into solution and thus destroy this slurry or particle-form process.

It is known that titanium has an effect on chromium polymerization catalysts which effect is generally beneficial. Consequently, silicatitania supports for chromium catalysts have found commercial utility. Generally, in such systems, the titanium content is relatively low, generally about 2 percent, in part because it is very difficult to achieve higher loadings of titanium, with about 5.5 percent being the maximum that can be easily incorporated as a monolayer on the surface.

SUMMARY OF THE INVENTION

It is an object of this invention to provide a catalyst capable of giving high melt flow polymer;

It is a further object of this invention to provide a catalyst suitable for use in slurry polymerization systems;

It is a further object of this invention to provide a method of producing an improved chromium-containing catalyst;

It is yet a further object of this invention to provide a silica-containing base for a catalyst which base contains a relatively high loading of titanium.

In accordance with this invention, an inorganic catalyst support is impregnated with a titanium polymer.

DESCRIPTION OF THE PREFERRED EMBODIMENTS

The titanium polymers employed in this invention are soluble in organic solvents. They are known compounds, and can be prepared from titanium tetraalkoxides having from 2 to about 10 carbon atoms per alkoxide group by employing a suitable quantity of water or a diol such as ethylene glycol to vary the chain length of the polymer from 2 to about 50 titanium atoms per molecule. Exemplary of such alkoxides are titanium tetraethoxide and titanium tetradecyloxide. In another method of preparation, titanium tetrachloride is reacted with an alcohol containing sufficient water to produce the desired chain length of the polymer, after which ammonia is added to neutralize the by-product HCl and to drive the reaction to completion. The resulting polymers contain up to about a calculated 30 weight percent titanium. These preparative methods as well as others are described in the Encyclopedia of Chemical Technology 20, 456–458 (1960), 2nd Edition, Kirk-Othmer, the disclosure of which is incorporated by reference. U.S. Pat. No. 2,621,193, which issued 12/9/52 to C. M. Langkammerer, the disclosure of which is hereby incorporated by reference, discloses the formation of soluble polymeric titania acid esters and ester-carboxylates through the reaction of a titanium tetraalkoxide with a substantially anhydrous aliphatic carboxylic acid.

By soluble titanium polymers is meant that they are readily dissolved in organic solvents, for instance hydrocarbons such as n-pentane, n-heptane, benzene, toluene, kerosene, chlorinated hydrocarbons such as chloroform, and alcohols such as isopropanol.

The titanium polymers may be dimers or higher polymers. They may be branched chain or straight chain. Their common characteristic is at least two titanium atoms connected by at least one oxygen. The following is a simplified example of the preparation of a simple dimer.

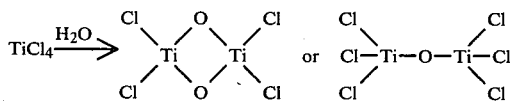

Obviously, if an alkoxide is used, the end groups will be different. The following is a generic description of dimers showing the formation is simplified form from an alkoxide:

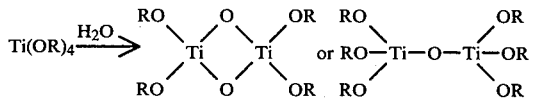

The general formula thus being $[TiO_x(OR')_y]_n$ where $2x+y=4$; x is from $\frac{1}{2}$ to 2; and $n=2$ to 50; and wherein OR' is said alkoxide group or chlorine, bromine or iodine.

The support with which the titanium polymer is combined is an inorganic support such as aluminum phosphate or a silica-containing material. The silica-containing material can be selected from catalytic grade silica, silica-alumina, silica-boria, silica-titania, silica-zirconia, and mixtures thereof in which the silica constitutes from 80 to 100 weight percent, preferably greater than 90 weight percent of the silica-containing material. Large pore silica made by removing water to convert a silica hydrogel to a xerogel by means of azeotropic distillation or washing with a water miscible volatile organic compound such as an alcohol or ester is preferred. The support can even be a silica-titania cogel to which additional titanium is added in accordance with this invention. Cogel formation can be carried out by adding a titanium compound to a mineral acid, introducing an alkali metal silicate into the acid containing said titanium compound to form a hydrogel, aging the hydrogel for a time of greater than one hour, washing the thus aged hydrogel to produce a substantially alkali metal free hydrogel, forming a mixture comprising the thus washed hydrogel and a normally liquid oxygen-containing water soluble organic compound, and separating said organic compound in water from said mixture to form a xerogel. The titanium is generally present in these cogels in an amount within the range of 0.5 to 5 weight percent titanium based on the weight of the dried cogel (xerogel).

A sufficient amount of the titanium polymer is applied to the substrate (support) in order to provide a titanium level based on the weight of the final calcined catalyst, ranging from about 2 to about 30 weight percent, preferably from 6 to 25 weight percent. The soluble titanium polymer is generally utilized in the form of a solution to obtain even distribution of the polymer on the substrate although it can also be used neat, if convenient to do so. Since the organic portion of the titanium polymer is volatilized during calcination, the weight percent titanium in the catalyst can be greater than the weight percent titanium in the titanium polymer.

In one embodiment, the titanium polymer is impregnated on the refractory substrate after which solvent, if any, is removed and the composite is activated. In another embodiment, the titanium polymer is added to the fluidized substrate at a convenient temperature, e.g. 100° to 250° C., after which the composite is activated.

The chromium compound to be included with the support is generally a water-soluble or organic solvent-soluble compound. It can be added prior to, during, or after addition of the titanium compound. Examples include ammonium chromate, chromium acetate, chromium nitrate, chromium trioxide, bis-arene chromium compounds such as dicumene chromium, esters such as di-t-butyl chromate, and chelates such as chromium acetylacetonate. The chromium can be coprecipitated with silica. More generally, if water-soluble, it is added to the purified silica hydrogel and the mixture dried, e.g. by oven drying, tray drying, spray drying, azeotrope distillation, or washing with a water miscible organic compound such as an alcohol or ester. Alternatively, the chromium can be impregnated aqueously on the dry silica mixture and the mixture dried again. If the chromium compound is organic solvent-soluble, it is usually applied nonaqueously to the dry gel, preferably a large pore gel to take advantage of the improved melt index capability of the finished catalyst, and the solvent is removed. The amount of chromium in the calcined catalyst can range from about 0.001-10, preferably 0.1-5, more preferably 0.5-1 weight percent based on the weight of the calcined support.

Regardless of the method chosen to add the chromium compound, the final composite including the titanium compound is activated for polymerization by calcination in an oxygen-containing atmosphere at an elevated temperature which is generally 500°-1000° C., preferably 590°-800° C. Activation can be carried out solely by calcination in dry air, for example, or it can be accomplished sequentially in a reducing atmosphere such as that provided by carbon monoxide and then air as disclosed in McDaniel et al, U.S. Pat. No. 4,151,122, the disclosure of which is hereby incorporated by reference. Temperatures of 700°-925° C., for instance can be used for this reducing portion of the treatment.

Polymerization using the catalyst produced in accordance with this invention is preferably carried out under slurry or particle form conditions as disclosed, for instance, in Norwood, U.S. Pat. No. 3,248,179, issued Apr. 26, 1966, the disclosure which is hereby incorporated by reference. Briefly, this can be accomplished, for example, by conducting the polymerization in the presence of a dry inert hydrocarbon diluent such as isobutane, n-heptane, methylcyclohexane, or benzene at a reactor temperature within the range of about 60° to about 110° C. and a reactor pressure of about 1.7 to about 4.1 MPa (250 to 600 psia). The polymer can be recovered, treated with $CO_2$ or $H_2O$, for example, to deactivate residual catalyst, stabilized with an antioxidant, such as butylated hydroxytoluene (BHT), and dried by conventional methods to obtain the final product. Hydrogen can be used in the reactor as known in the art to provide some control of the molecular weight of the polymer. The polymerization can be conducted batchwise in a stirred reactor or continuously in a loop reactor with or without a settling leg or in a series of reactors. If desired, these catalysts can be used in solution or gas phase or other conventional polymerization systems but their ability to produce higher melt flow polymer is of primary importance in slurry systems.

The catalyst of this invention is suitable for the production of normally solid ethylene homopolymer and also for the production of predominantly ethylene copolymer using as the monomer predominantly ethylene. Ethylene can be copolymerized with one or more higher aliphatic mono-1-olefins containing from 3 to about 10 carbon atoms such as propylene, 1-butene, 1-pentene, 1-hexene, 1-octene and/or a conjugated diolefin containing 4 to about 12 carbon atoms in any proportion. In such polymers, the ethylene content generally ranges from about 97 to 99.6 weight percent which is obtained using from about 93 to 99.6 weight percent ethylene monomer, the remainder being said higher olefin comonomer. More broadly, ethylene copolymers can be made using 80 to 99.8 weight percent ethylene and 20 to 0.2 weight percent comonomer in the feed.

EXAMPLE I

A solution containing 44 mL of titanium tetraisopropoxide (0.147 mole) and 260 mL of isopropanol (3.42 moles) was mixed with stirring with a solution containing 1.3 mL of water (0.0722 mole) and 300 mL of isopropanol (3.05 moles) to produce a soluble titanium isopropoxide polymer. The calculated mole ratio of titanium tetraisopropoxide:water was 2.04:1; it is believed that a dimer is formed in the reaction that can be formulated as $Ti_2O(Oi-C_3H_7)_6$ and the calculated titanium content of the dimer is about 20.6 weight percent.

Portions of the dimer solution in an excess of the alcohol were used to impregnate portions of a dry synthetic large pore silica containing 1 weight percent chromium as chromic acetate on a dry basis. The base catalyst was analyzed and found to have a pore volume of 3 cc/g and a surface area of 320 m²/g. Following impregnation the solvent was removed by evaporation and 10 g samples were individually activated in a 46 mm OD quartz tube surrounded by an electric furnace under fluidizing conditions at the specified temperature employing 42 liters of specified gas per hour STP as the fluidizing means.

Each titanated catalyst sample was brought to 650° C. (1200° F.) in dry air, the air was purged with nitrogen and the nitrogen in turn displaced with carbon monoxide as the temperature was brought to 870° C. (1600° F.) and held at that temperature for 3 hours. The carbon monoxide was purged with nitrogen as the temperature was lowered to 595° C. (1100° F.) and the nitrogen displaced with dry air and heating continued at that temperature in air for 2 hours. Heating was then stopped as each activated catalyst sample was cooled in dry air to about 45° C. (115° F.), then recovered and stored in a container in dry air pending further use.

Ethylene polymerization was conducted in a stainless steel reactor of 1 gal. (3.8 L) capacity containing 1.25 L of dry isobutane and an ethylene pressure of 3.9 MPa (565 psia). Catalyst weight employed in the runs ranged from about 0.03 g to about 0.06 g. Each run was conducted to yield about 5000 g polymer per g catalyst. Reaction temperature used and the results obtained are presented in Table I.

fivefold by an increase of 5° C. in reactor temperature from 102° to 107° C. Because of the interacting effects previously described for the same invention catalyst used in run 3, the reactor temperature of 107° C. is too high and the catalyst of run 6 failed to respond.

EXAMPLE II

Two catalysts were prepared by impregnating individual 8 g portions of the dry silica-chromic acetate composite used in Example I slurried in about 25 g of

TABLE I

| | | | | | | | Ethylene Pressure | | Run Time | Productivity[b] | Polymer | | |
|---|---|---|---|---|---|---|---|---|---|---|---|---|---|
| Run No. | Weight, % Ti Calc. | Found[a] | Catalyst Color | Weight % Cr. (VI) | Reactor Temp. °C. | MPa | (psia) | Min. | g/g | MI[c] | HLMI[d] MI | Remarks |
| 1 | 0 | 0.10 | orange-tan | 0.58 | 102 | 3.9 | (565) | 60 | 5570 | 0.9 | 61 | Control |
| 2 | 5 | 4.26 | green | 0.12 | 102 | 3.9 | (565) | 90 | 5690 | 4.1 | 44 | Invention |
| 3 | 10 | 8.30 | yellow-tan | 0.01 | 102 | 3.9 | (565) | 82 | 1300 | 19.7 | —[e] | Invention |
| 4 | 0 | 0.10 | orange-tan | 0.58 | 107 | 3.9 | (565) | 69 | 4890 | 4.7 | 43 | Control |
| 5 | 7.5 | —[e] | green | 0.22 | 107 | 3.9 | (565) | —[e] | 5810 | 27.7 | 39 | Invention |
| 6 | 10 | 8.30 | tan | 0.01 | 107 | 3.9 | (565) | | did not respond (dead catalyst) | | | |

Ethylene Polymerization, 870° C./595° C. CO/Air Catalyst Activation

[a]Analyzed value.
[b]Grams polyethylene/gram catalyst.
[c]MI is melt index, ASTM D 1238-65T, Condition E.
[d]HLMI is high load melt index, ASTM D 1238-65T, Condition F. The HLMI/MI ratio is thought to be related to polymer molecular weight distribution. The larger the value the broader the distribution.
[e]A dash indicates a reading or value is not obtained.

Inspection of the data given in Table I indicates that active ethylene polymerization catalysts can be produced by impregnating a silica-chromium compound with a titanium alkoxide polymer and activating the composite. As the titanium content of the catalyst increases its melt index capability also increases. The melt index of the polymer produced in control run 1, the catalyst containing about 0.1 weight percent Ti (by inadvertent contamination), is about 1. In invention run 2, the catalyst containing about 4.3 weight percent Ti, the polymer melt index is about 4, and in invention run 3, the catalyst containing about 8.3 weight percent Ti, the polymer melt index is about 20. The data in runs 1–3 are all obtained at a reactor temperature of 102° C. The relatively low productivity value shown in invention 3 is believed to result from a combination of factors. (1) As the Ti content of the catalyst increases, its susceptibility to sintering at high activation temperatures, e.g. 870° C. also increases although the effect appears to be moderated in a carbon monoxide atmosphere and the activity of the catalyst may become impaired. (2) The chromium (VI) content of the catalyst appears to decrease with increasing Ti content and may decrease activity somewhat. This is because the titanium interferes at high temperatures with the normal tendency of silica to stabilize chromium in the plus 6 valence state at high temperatures. (3) Fouling may be encountered at relatively high reactor temperatures. In invention run 3, 102° is employed and is borderline with respect to fouling in this instance. It is now realized that with high Ti-containing catalysts, good polymerization results can be obtained by activating them at lower activation temperatures, e.g. 600° to 800° and operating at lower reactor temperatures, if necessary, e.g. 85° to 100° C. Conventional activation temperatures of 500° to 1000° C., preferably 600° to 870° C. can be used, however, but at the higher titanium concentrations, the lower temperatures are preferred.

The effect of higher reactor temperatures is shown in the melt index values of the polymers made with the control catalyst (run 4) and titanated invention catalysts (runs 5, 6). The melt index values are increased roughly dry n-pentane with suitable portions of a hydrocarbon solution of a commercially available titanium tetrabutoxide polymer having a specified TiO$_2$ content of 30–35 weight percent, equivalent to a Ti content of about 18–21 weight percent (Kay-Fries Chem.). The polymer solution was made by dissolving 514 g of the honey-like titanium tetrabutoxide polymer in 257 g of dry n-heptane.

One catalyst was prepared by mixing 10 mL of the polymer solution with one silica-containing slurry to give a Ti content of about 12 weight percent based on the activated (calcined catalyst).

The second catalyst was prepared by mixing with the other silica-containing slurry 18 mL of the polymer solution to give a Ti content of about 20 weight percent based on the activated catalyst. The hydrocarbon solvents were removed by evaporation with a stream of nitrogen and each dried composite was activated under fluidized bed conditions by employing the quartz tube as before for 3 hours at 650° C. with 42 L/hour dry air only as the fluidizing gas.

Ethylene was polymerized in the 1 gal reactor as before employing about 0.06 g portions of each catalyst, 3.9 MPa ethylene pressure, the to be specified reactor temperature (107° C. or 102° C.), and in the presence of 1.25 L of dry isobutane. Each run was conducted to yield about 3,000 g polymer per g catalyst (g/g catalyst).

The conditions employed and results obtained are summarized below in Table II.

TABLE II

Ethylene Polymerization, 650° C. Air Catalyst Activation

| | Run No. | |
|---|---|---|
| | 7 | 8 |
| Catalyst Wt. g | 0.0685 | 0.0595 |
| Wt. Percent Ti, approx. | 12 | 20 |
| Reactor Temp. °C. | 107 | 102 |
| Run Time, Min. | 76 | 80 |
| Productivity, g/g catalyst | 3285 | 3195 |
| Polymer | | |
| Melt Index (MI) | 0.64 | 0.0686 |

TABLE II-continued

Ethylene Polymerization, 650° C. Air Catalyst Activation

| | Run No. 7 | Run No. 8 |
|---|---|---|
| High Load Melt Index (HLMI) | 41.2 | 4.15 |
| HLMI/MI | 64 | 60 |

The results in Table II show that ethylene polymerization catalysts can be obtained with titanated silica-chromium oxide catalysts containing from about 12 to about 20 weight percent titanium as $TiO_2$. The intent in this example is to produce low melt index polymers which can be usefully employed in various applications requiring toughness and environmental stress cracking resistance. As a means to obtaining low melt index capability of the catalysts, they are activated only in air at a relatively low temperature. Thus while the primary value of the catalysts of this invention is in producing high melt flow polymer, they are also of unique value in this capability of producing a whole spectrum of polymers from a single catalyst through variations in activation techniques.

The relatively high values of about 60–65 obtained for the HLMI/MI ratios are indicative of broad molecular weight distribution polymers. Such polymers are known in the prior art to exhibit good environmental stress cracking resistance and toughness, especially when coupled with low melt index values of less than about 1.

A fully hydroxylated silica surface contains 4.5 $OH/nm^2$ (Peri & Hensley-J. Phys., Chem. 72 (8), 2926-1968). Therefore, if each OH reacted with one $Ti(OR)_4$, the maximum Ti content achievable by conventional means would be:

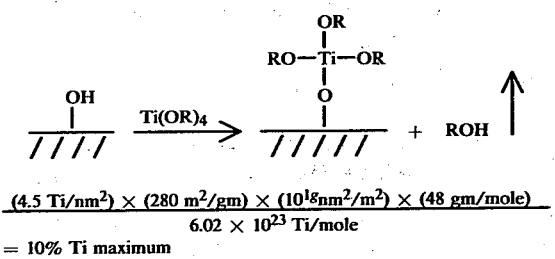

$$\frac{(4.5 \text{ Ti}/nm^2) \times (280 \text{ m}^2/gm) \times (10^{18} nm^2/m^2) \times (48 \text{ gm/mole})}{6.02 \times 10^{23} \text{ Ti/mole}}$$

= 10% Ti maximum or (more likely) if the $Ti(OR)_4$ reacts with a pair of hydroxyls:

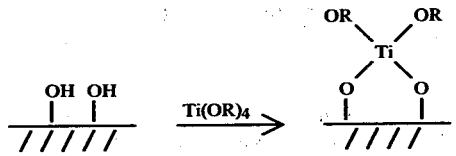

maximum coverage would be 5%. Experimentally the maximum was found to be 5.5%.

While this invention has been described in detail for the purpose of illustration, it is not to be construed as limited thereby but is intended to cover all changes and modifications within the spirit and scope thereof.

I claim:

1. A process for producing a catalyst comprising combining an inorganic support with a titanium polymer, said support having a chromium compound combined therewith either before, during or after said titanium polymer and said support are combined; and activating the resulting support-titanium-chromium composition in an oxygen-containing atmosphere at a temperature within the range of 500°-1000° C., said titanium polymer being present in an amount sufficient to give 2 to 30 weight percent titanium based on the weight of the thus activated composition.

2. A method according to claim 1 wherein said support is a silica-containing material and wherein said chromium compound is present in an amount sufficient to give chromium in an amount within the range of 0.1 to 5 weight percent based on the weight of said thus activated composition.

3. A method according to claim 1 wherein said support is a silica-containing material and wherein said titanium is present in an amount within the range of 6 to 25 weight percent.

4. A method according to claim 1 wherein said support is a silica-containing material and wherein said titanium polymer is combined with said silica-containing material by impregnating said silica-containing material with a solution of said titanium polymer dissolved in an organic solvent, said titanium polymer being a dimer of the formula $TiO_2(Oi\text{-}C_3H_7)_6$.

5. A method according to claim 1 wherein said support is a silica-containing material and wherein said titanium polymer is prepared from a titanium tetraalkoxide having 2 to 10 carbon atoms per alkoxide group employing a suitable quantity of water or diol to vary the chain length of the polymer from 2 to about 50 titanium atoms per molecule.

6. A method according to claim 1 wherein said support is a silica-containing material and wherein said silica-titanium-chromium composition is subjected to a reduction step prior to said activation being done in the presence of air.

7. A method according to claim 1 wherein said support is a silica-containing material and wherein said silica-containing material is a large pore silica prepared by removing water from a hydrogel stage thereof by means of azeotropic distillation or washing with a water miscible volatile organic compound.

8. A method according to claim 1 wherein said support is a silica-containing material and wherein said activating is carried out at a temperature within the range of 590° to 800° C.

9. A method according to claim 8 wherein said titanium polymer comprises a dimer produced by combining titanium tetraisopropoxide with water and isopropanol, said titanium polymer is combined with said silica-containing material by impregnating said silica-containing material with a solution of said titanium polymer in isopropanol, said solution being used in an amount sufficient to give 6 to 25 weight percent titanium based on the weight of the final activated composition, said chromium compound is present in an amount sufficient to give chromium in an amount within the range of 0.1 to 5 weight percent based on the weight of said activated composition, said activating is carried out at a temperature of 600° to 800° C. in air, and wherein prior to said activating the silica-titanium-chromium composition is subjected to a reduction step in an ambient comprising carbon monoxide at a temperature within the range of 700° to 925° C.

* * * * *